(12) United States Patent
Hall et al.

(10) Patent No.: US 7,139,218 B2
(45) Date of Patent: Nov. 21, 2006

(54) DISTRIBUTED DOWNHOLE DRILLING NETWORK

(75) Inventors: David R. Hall, Provo, UT (US); H. Tracy Hall, Jr., Provo, UT (US); Joe Fox, Spanish Fork, UT (US); David S. Pixton, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 169 days.

(21) Appl. No.: 10/710,790

(22) Filed: Aug. 3, 2004

(65) Prior Publication Data
US 2005/0035874 A1   Feb. 17, 2005

Related U.S. Application Data

(60) Provisional application No. 60/481,225, filed on Aug. 13, 2003.

(51) Int. Cl.
*H04H 9/00*    (2006.01)
(52) U.S. Cl. .................. 367/82; 340/853.3; 702/6; 370/463
(58) Field of Classification Search ............. 367/82; 340/853.3, 853.9; 702/9, 6; 370/463, 474
See application file for complete search history.

(56) References Cited

U.S. PATENT DOCUMENTS

| | | | |
|---|---|---|---|
| 2,414,719 A | | 1/1947 | Cloud |
| 3,518,608 A | | 6/1970 | Papadopoulos |
| 3,930,220 A | * | 12/1975 | Shawhan .................... 367/82 |
| 4,254,481 A | * | 3/1981 | Smither et al. ............. 367/82 |
| 4,293,937 A | * | 10/1981 | Sharp et al. ................ 367/82 |
| 4,298,970 A | * | 11/1981 | Shawhan et al. ............ 367/82 |
| 4,320,473 A | * | 3/1982 | Smither et al. ............. 367/82 |
| 4,739,325 A | | 4/1988 | MacLeod |
| 4,788,544 A | | 11/1988 | Howard |
| 5,959,547 A | | 9/1999 | Tubel et al. |
| 6,012,015 A | | 1/2000 | Tubel |
| 6,252,518 B1 | | 6/2001 | Laborde |
| 6,374,913 B1 | | 4/2002 | Robbins et al. |
| 6,392,317 B1 | | 5/2002 | Hall et al. |
| 6,630,890 B1 | * | 10/2003 | Endo et al. .............. 340/853.9 |
| 6,648,082 B1 | | 11/2003 | Schultz et al. |
| 6,670,880 B1 | | 12/2003 | Hall et al. |
| 6,688,396 B1 | | 2/2004 | Floerke et al. |
| 6,712,160 B1 | | 3/2004 | Schultz et al. |

(Continued)

OTHER PUBLICATIONS

PCT/US 03/16478, Published Dec. 4, 2003, Applicant Baker Hughes; International Search Report: "Documents Considered to Be Relevant".

*Primary Examiner*—Albert K. Wong
(74) *Attorney, Agent, or Firm*—Jeffery E. Daly

(57) ABSTRACT

A high-speed downhole network providing real-time data from downhole components of a drilling strings includes a bottom-hole node interfacing to a bottom-hole assembly located proximate the bottom end of a drill string. A top-hole node is connected proximate the top end of the drill string. One or several intermediate nodes are located along the drill string between the bottom-hole node and the top-hole node. The intermediate nodes are configured to receive and transmit data packets transmitted between the bottom-hole node and the top-hole node. A communications link, integrated into the drill string, is used to operably connect the bottom-hole node, the intermediate nodes, and the top-hole node. In selected embodiments, a personal or other computer may be connected to the top-hole node, to analyze data received from the intermediate and bottom-hole nodes.

20 Claims, 8 Drawing Sheets

U.S. PATENT DOCUMENTS

| | | |
|---|---|---|
| 6,717,501 B1 | 4/2004 | Hall et al. |
| 6,722,450 B1 | 4/2004 | Schultz |
| 6,732,052 B1 | 5/2004 | Macdonald |
| 6,799,632 B1 | 10/2004 | Hall et al. |
| 6,816,082 B1 * | 11/2004 | Laborde .................. 340/853.3 |
| 6,821,147 B1 | 11/2004 | Hall et al. |
| 6,830,467 B1 | 12/2004 | Hall et al. |
| 6,844,498 B1 | 1/2005 | Hall et al. |
| 6,866,306 B1 | 3/2005 | Boyle et al. |
| 6,888,473 B1 | 5/2005 | Hall et al. |
| 6,913,093 B1 | 7/2005 | Hall et al. |
| 6,929,493 B1 | 8/2005 | Hall et al. |
| 6,945,802 B1 | 9/2005 | Hall et al. |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |

* cited by examiner

2

DISTRIBUTED DOWNHOLE DRILLING NETWORK

FEDERAL RESEARCH STATEMENT

This invention was made with government support under contract No. DE-FC26-01NT41229 awarded by the Department of Energy. The government has certain rights in this invention.

CROSS REFERENCE TO RELATED APPLICATIONS

The present application claims the priority of U.S. Provisional Patent Application Ser. No. 60/481,225 filed on Aug. 13, 2003, which is herein incorporated by reference.

BACKGROUND OF INVENTION

1. The Field of the Invention

This invention relates to oil and gas drilling, and more particularly to apparatus and methods providing a downhole network for transmitting information between downhole drilling components, and from downhole drilling components to the ground's surface.

2. The Relevant Art

MWD (measurement while drilling) involves the transmission of data from downhole drilling components to the earth's surface in real time. Once reaching ground level, the data may be analyzed. The data may be used to adjust drilling parameters, such as drilling direction, penetration speed, and the like. Data may originate from various downhole components, including a bottom hole assembly comprising a drill bit and other components, and from sensors and tools located farther up the drill string. What is lacking are apparatus and methods to effectively link or network various downhole sensors and tools together such that they may communicate with one another, transmit data at high speeds to the ground's surface, or receive commands originating from the ground's surface.

The advantages of computer networks are well known. By interconnecting two or more computers, computing resources, data storage devices, and peripherals may be shared. Data and applications may be seamlessly transferred or accessed between computers connected to the network. Redundant components enable data to be backed up from one computer to another. Moreover, the performance provided by modern networking protocols provides for high-speed bi-directional transmission of data from one location to another. Nevertheless, few if any instances of the prior art teach the integration of a network into a downhole drill string.

U.S. Pat. No. 6,218,959 to Smith describes a system and method for fail-safe communication of information transmitted in the form of electromagnetic wave fronts. These wave fronts propagate through the earth between surface equipment and downhole components. The system comprises two or more repeaters disposed within a well bore such that the two repeaters receive each signal carrying the telemetered information. The repeater that is farther from the source includes a memory device that stores information carried in the signal. A timer device, in the repeater that is farther from the source, triggers the retransmission of the information after a predetermined time period, unless the repeater that is farther from the source has detected a signal carrying the information, generated by the repeater that is closer to the source.

The repeaters taught by Smith are wireless repeaters and would not be suitable for a hardwired network integrated into a drill string. Moreover, the repeaters are used exclusively for receiving and forwarding data signals. These repeaters lack many features, such as the ability to gather data or provide control signals at nodes along the drill string.

U.S. Pat. No. 5,959,547 to Tubel et al. teaches a plurality of downhole control systems interconnected by a network including a server for monitoring and controlling network communications. Each downhole control system is associated with a zone in one or more wells. The downhole control systems communicate directly with each other transferring information and commands as necessary. The downhole server monitors network communications to resolve data collisions and provides supervisory functions. The system taught by Tubel et al. is designed for production well systems and would not function in drill strings.

U.S. Patent Application No. 20030038734 to Hirsch et al. describes a reservoir production control system includes a plurality of wells for producing a reservoir linked to a central computer over a downhole communication network and a surface communication network. Both the downhole and the surface communication networks are wireless communications paths for transmitting downhole data and surface data to the central computer.

Both networks include a series of interconnected tubing or pipe that allows transmission of data over electrically isolated portions of the pipe and tubing. After integrating and analyzing all relevant data and comparing the data with a reservoir model, the central computer initiates changes in a plurality of downhole control devices associated with the wells, thereby optimizing the production of the reservoir. Like the Tubel et al. reference, the system taught by Hirsch et al. is designed for production well systems and would not be suitable for integration into a drill string.

In view of the foregoing, what are needed are apparatus and methods to interconnect downhole-drilling components by way of a high-speed network. Such a high-speed network may enable high-speed data transmission between downhole components, and between downhole components and the ground's surface.

What are further needed are apparatus and methods to acquire or gather data at various points or nodes along the drill string, for transmission along the network.

It would be a further advance to allow control or other signals to be transmitted from the surface to downhole components or tools connected to the network.

It would be a further advance to provide downhole nodes, that not only repeat or amplify a signal, but are also configured to gather data from sensors such as inclinometers, pressure transducers, thermocouples, accelerometers, imaging devices, seismic devices, and the like.

SUMMARY OF INVENTION

In view of the foregoing, it is a primary object of the present invention to interconnect downhole-drilling components by way of a high-speed network. A high-speed network in accordance with the invention enables high-speed data transmission between downhole components, and between downhole components and the ground's surface. It is a further object of the present invention to provide apparatus and methods to acquire or gather data at various points or nodes along the drill string, for transmission along the network. It is yet a further object to enable control or other signals to be transmitted from the surface to downhole components or tools connected to the network.

Consistent with the foregoing objects, and in accordance with the invention as embodied and broadly described herein, a downhole network is disclosed in one embodiment of the present invention as including a bottom-hole node interfacing to a bottom-hole assembly located proximate the bottom end of a drill string. A top-hole node is connected proximate the top end of the drill string. One or several intermediate nodes are located along the drill string between the bottom-hole node and the top-hole node. The intermediate nodes are configured to receive and transmit data packets transmitted between the bottom-hole node and the top-hole node. A communications link, integrated into the drill string, is used to operably connect the bottom-hole node, the intermediate nodes, and the top-hole node.

In selected embodiments, a personal or other computer may be connected to the top-hole node, to analyze data received from the intermediate and bottom-hole nodes. The personal computer may include a user interface to display data received from the intermediate and bottom-hole nodes.

The bottom hole assembly may include various sensors or tools, including but not limited to pressure sensors, inclinometers, temperature sensors, thermocouplers, accelerometers, imaging devices, and seismic devices. In selected embodiments, the intermediate nodes may function primarily as repeaters. In other embodiments, the intermediate nodes may perform functions such as signal amplification, filtering, error checking, routing, and switching.

In selected embodiments, a module, housing the intermediate node, may be designed such that it may be inserted at a point along the drill string. The intermediate node may be further configured to gather data from at least one of a downhole sensor and a downhole tool, located along the drill string, proximate the intermediate node.

As with most networks, the top-hole node, the intermediate nodes, and the bottom-hole node may be assigned a unique network address. Likewise, data packets transmitted between the nodes may include a source address, identifying the source of a packet, and a destination address, identifying the destination of a packet. Data packets may carry various types of information, such as data originating from pressure sensors, inclinometers, temperature sensors, thermocouplers, accelerometers, imaging devices, and seismic devices.

In another aspect of the present invention, a method for transmitting information along a drill string includes transmitting, from a bottom-hole node, data packets along a communications link integrated into the drill sting. The method further includes receiving, by an intermediate node, the data packets. The intermediate node is located at an intermediate location along the drill string, and operably connected to the communications link. The method further includes amplifying, by the intermediate node, the data packets, and forwarding the data packets to a top-hole node operably connected to the communications link.

In certain embodiments, a method in accordance with the invention may further include receiving, by a personal computer, data packets from the top-hole node, for analysis. The personal computer may display, on a user interface, data received from the intermediate and bottom-hole nodes. A method may also include processing, by the intermediate node, data packets that are received. Processing may include tasks such as filtering, error checking, routing, and switching. The top-hole node, the intermediate node, and the bottom-hole node may each be assigned a unique network address.

In selected embodiments, a method in accordance with the invention may include gathering, by the intermediate node, a data packets containing data gathered from downhole sensors or downhole tools located near the intermediate node along the drill string. Each data packet may include a source address, identifying the source of a packet, and a destination address, identifying the destination of a packet. Data packets may carry data originating from devices or sensors such as pressure sensors, inclinometers, temperature sensors, thermocouplers, accelerometers, imaging devices, and seismic devices.

BRIEF DESCRIPTION OF DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings.

DETAILED DESCRIPTION

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Figure 1:
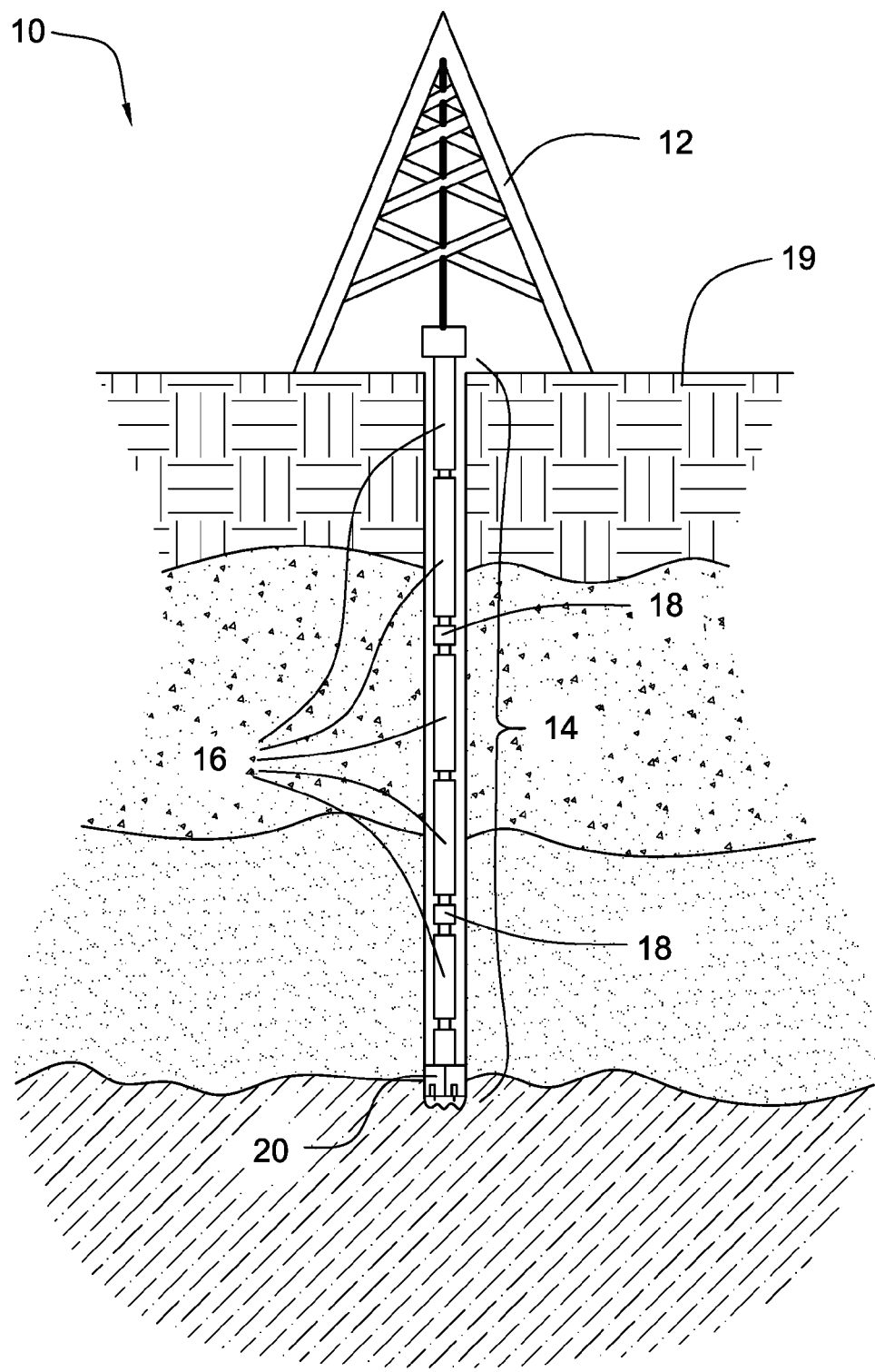
FIG. 1 is a profile view of a drill rig illustrating a context for using an apparatus and method in accordance with the invention.

Referring to FIG. 1, a drill rig 10 may include a derrick 12 and a drill string 14 comprised of multiple sections of drill pipe 16 and other downhole tools 16. A bottom-hole assembly 20, connected to the bottom of the drill string 14, may include a drill bit, sensors, and other downhole tools. Because a drill string 14 may penetrate into the ground 20,000 feet or more, receiving and transmitting data from a bottom-hole assembly 20 to the surface may present numerous obstacles. Data must be transmitted along what may be hundreds of sections of drill pipe, and across each tool joint.

Signal loss may occur at each of the tool joints due to coupling losses and mismatched transmission elements. For example, in selected embodiments, an electrical signal transmitted along the drill string 14 may be transmitted as a magnetic field across tool joints, losing energy each time it is converted. Signal loss may also occur because of voltage drops, or other factors, in cable, wires, or other transmission media extending the length of the drill string 14. Thus, apparatus and methods are needed to ensure that data received from a bottom-hole assembly 20 or other downhole tools 16 is safely transmitted to the surface.

In selected embodiments in accordance with the invention, network nodes 18 may be inserted at desired intervals along the drill string 14, such as every 1000 to 5000 feet, to perform various functions. For example, the network nodes 18 may function as signal repeaters 18 to regenerate data signals traveling up and down the drill string 14. These nodes 18 may be integrated into an existing drill pipe 16 or downhole tool 16, or may be independent downhole tools 18.

Figure 2:
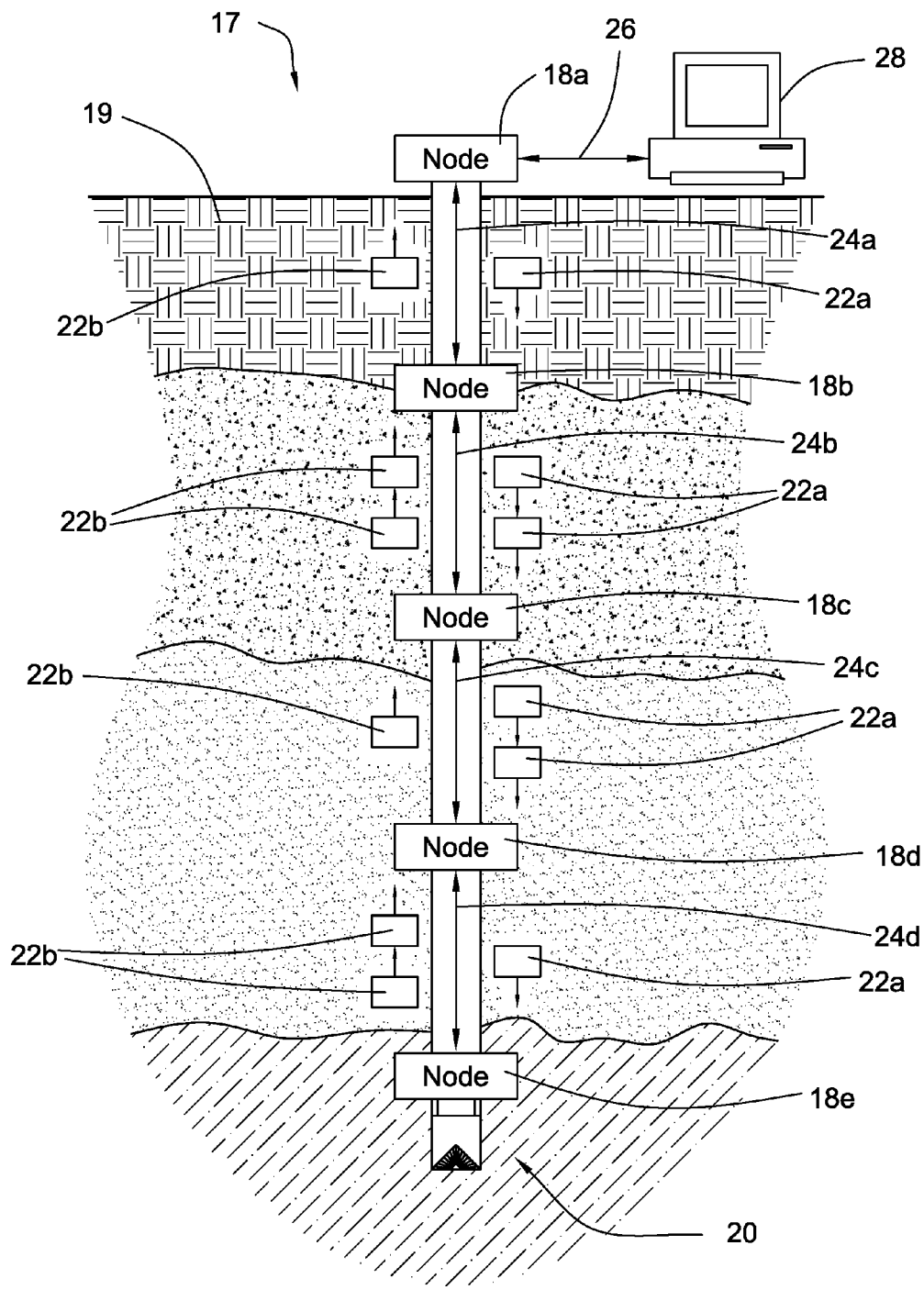
FIG. 2 is a profile view illustrating one configuration of various nodes used to implement a downhole network in accordance with the invention.

Referring to FIG. 2, in selected embodiments a downhole network 17 may be used to transmit information along a drill string 14. A downhole network 17 may include multiple nodes 18a–e spaced up and down a drill string 14. The nodes 18a–e may be intelligent computing devices 18a–e, or may be less intelligent connection devices, such as hubs or switches located along the length of the network 17. Each of the nodes 18 may or may not be addressed on the network 17. A node 18e may be located to interface with a bottom hole assembly 20 located at the end of the drill string 14. A bottom hole assembly 20 may include a drill bit, drill collar, and other downhole tools and sensors designed to gather data and perform various tasks.

Other intermediate nodes 18b–d may be located or spaced to act as relay points for signals traveling along the downhole network 17 the network 17 and to provide interfaces 18b–d to various tools or sensors located along the length of the drill string 14. Likewise, a top-hole node 18a may be located at the top or proximate the top of a drill string 14 to act as an interface to an analysis device 28, such as a personal computer 28.

Communication links 24a–d may be used to connect the nodes 18a–e to one another. The communication links 24a–d may be comprised of cables or other transmission media integrated directly into tools 16 of the drill string 14, routed through the central bore of a drill string, or routed externally to the drill string. Likewise, in certain contemplated embodiments in accordance with the invention, the communication links 24a–d may be wireless connections. In certain embodiments, the downhole network 17 may function as a packet-switched or circuit-switched network 17.

As in most networks, packets 22a, 22b may be transmitted between nodes 18a–e. The packets 22b may be used to carry data from tools or sensors, located downhole, to an up-hole node 18a, or may carry protocols or data necessary to the functioning of the network 17. Likewise, selected packets 22a may be transmitted from up-hole nodes 18a to downhole nodes 18b–e. These packets 22a, for example, may be used to send control signals from a top-hole node 18a to tools or sensors located proximate various downhole nodes 18b–e. Thus, a downhole network 17 may provide an effective means for transmitting data and information between components located downhole on a drill string 14, and devices located at or near the surface of the earth 19.

Figure 3:
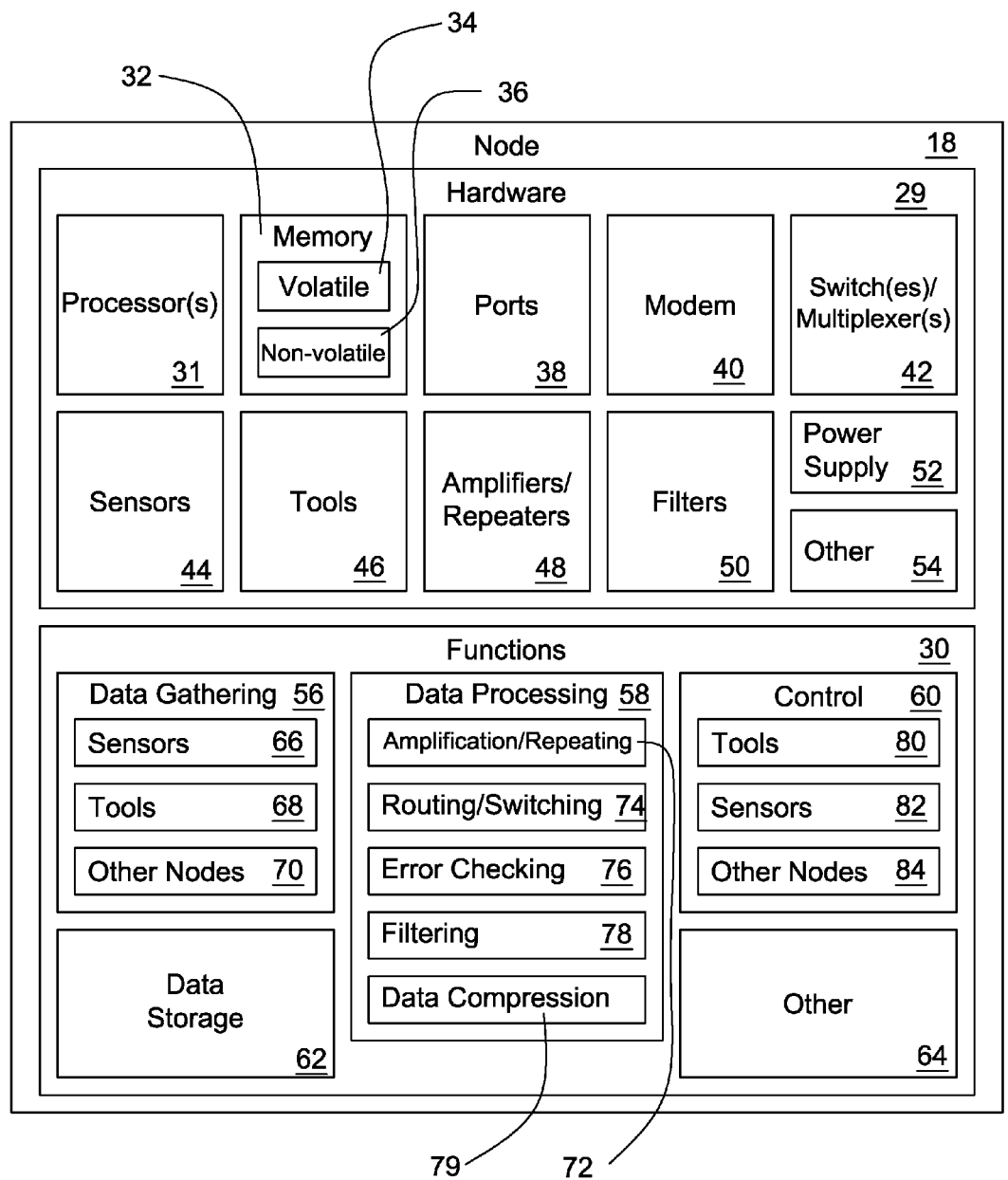
FIG. 3 is a schematic block diagram illustrating certain embodiments of hardware and corresponding functions provided by a node in accordance with the invention.

Referring to FIG. 3, a network node 18 in accordance with the invention may include hardware 29 providing functionality to the node 18, as well as functions 30 performed by the node 18. The functions 30 may be provided strictly by the hardware 29, applications executable on the hardware 29, or a combination thereof. For example, hardware 29 may include one or several processors 31 capable of processing or executing instructions or other data. Processors 31 may include hardware such as busses, clocks, cache, or other supporting hardware.

Likewise, hardware 29 may include volatile 34 and non-volatile 36 memory 32 providing data storage and staging areas for data transmitted between hardware components 29. Volatile memory 34 may include random access memory (RAM) or equivalents thereof, providing high-speed memory storage. Memory 32 may also include selected types of non-volatile memory 36 such as read-only-memory (ROM), or other long term storage devices, such as hard drives and the like. Ports 38 such as serial, parallel, or other ports 38 may be used to input and output signals uphole or downhole from the node 18, provide interfaces with sensors or tools located proximate the node 18, or interface with other tools or sensors located in a drilling environment.

A modem 40 may be used to modulate digital data onto a carrier signal for transmission uphole or downhole along the network 17. Likewise, the modem 40 may demodulate digital data from signals transmitted along the network 17. A modem 40 may provide various built in features including but not limited to error checking, data compression, or the like. In addition, the modem 40 may use any suitable modulation type such as QPSK, OOK, PCM, FSK, QAM, or the like. The choice of a modulation type may depend on a desired data transmission speed, as well as unique operating conditions that may exist in a downhole environment. Likewise, the modem 40 may be configured to operate in full duplex, half duplex, or other mode. The modem 40 may also use any of numerous networking protocols currently available, such as collision-based protocols, such as Ethernet, or token-based protocols such as are used in token ring networks.

A node 18 may also include one or several switches 42 or multiplexers 42 to filter and forward packets between nodes 18 of the network 17, or combine several signals for transmission over a single medium. Likewise, a demultiplexer may be included with the multiplexer 42 to separate multiplexed signals received on a transmission line.

A node 18 may include various sensors 44 located within the node 18 or interfacing with the node 18. Sensors 44 may include data gathering devices such as pressure sensors, inclinometers, temperature sensors, thermocouplers, accelerometers, imaging devices, seismic devices, or the like. Sensors 44 may be configured to gather data for transmission up the network 17 to the grounds surface, or may also receive control signals from the surface to control selected parameters of the sensors 44. For example, an operator at the surface may actually instruct a sensor 44 to take a particular measurement. Likewise, other tools 46 located downhole may interface with a node 18 to gather data for transmission uphole, or follow instructions received from the surface.

Since a drill string may extend into the earth 20,000 feet or more, signal loss or signal attenuation that occurs when transmitting data along the downhole network 17, may be an important or critical issue. Various hardware or other devices of the downhole network 17 may be responsible for causing different amounts of signal attenuation. For example, since a drill string is typically comprised of multiple segments of drill pipe or other drill tools, signal loss may occur each time a signal is transmitted from one downhole tool to another. Since a drill string may include several hundred sections of drill pipe or other tools, the total signal loss that occurs across all of the tool joints may be quite significant. Moreover, a certain level of signal loss may occur in the cable or other transmission media extending from the bottom-hole assembly 20 to the surface.

To reduce data loss due to signal attenuation, amplifiers 48, or repeaters 48, may be spaced at various intervals along the downhole network 17. The amplifiers 48 may receive a data signal, amplify it, and transmit it to the next node 18. Like an amplifier 48, a repeater 48 may be used to receive a data signal and retransmit it at a higher power. However, unlike an amplifier 48, a repeater 48 may remove noise from the data signal.

Likewise, a node 18 may include various filters 50. Filters 50 may be used to filter out undesired noise, frequencies, and the like that may be present or introduced into a data signal traveling up or down the network 17. Likewise, the node 18 may include a power supply 52 to supply power to any or all of the hardware 29. The node 18 may also include other hardware 54, as needed, to provide desired functionality to the node 18.

The node 18 may provide various functions that are implemented by software, hardware, or a combination thereof. For example, functions 30 of the node 18 may include data gathering 56, data processing 58, control 60, data storage 62, and other functions 64. Data may be gathered 56 from sensors 66 located downhole, tools 68, or other nodes 70 in communication with a selected node 18. This data 56 may be transmitted or encapsulated within data packets transmitted up and down the network 17.

Likewise, the node 18 may provide various data processing functions 58. For example, data processing may include data amplification 72 or repeating 72, routing 74 or switching 74 data packets transmitted along the network 17, error checking 76 of data packets transmitted along the network 17, filtering 78 of data, as well as data compression 79 or decompression 79. Likewise, a node 18 may process various control signals 60 transmitted from the surface to tools 80, sensors 82, or other nodes 84 located downhole. Likewise, a node 18 may store data that has been gathered from tools, sensors, or other nodes 18 within the network 17. Likewise, the node 18 may include other functions 64, as needed.

Figure 4:
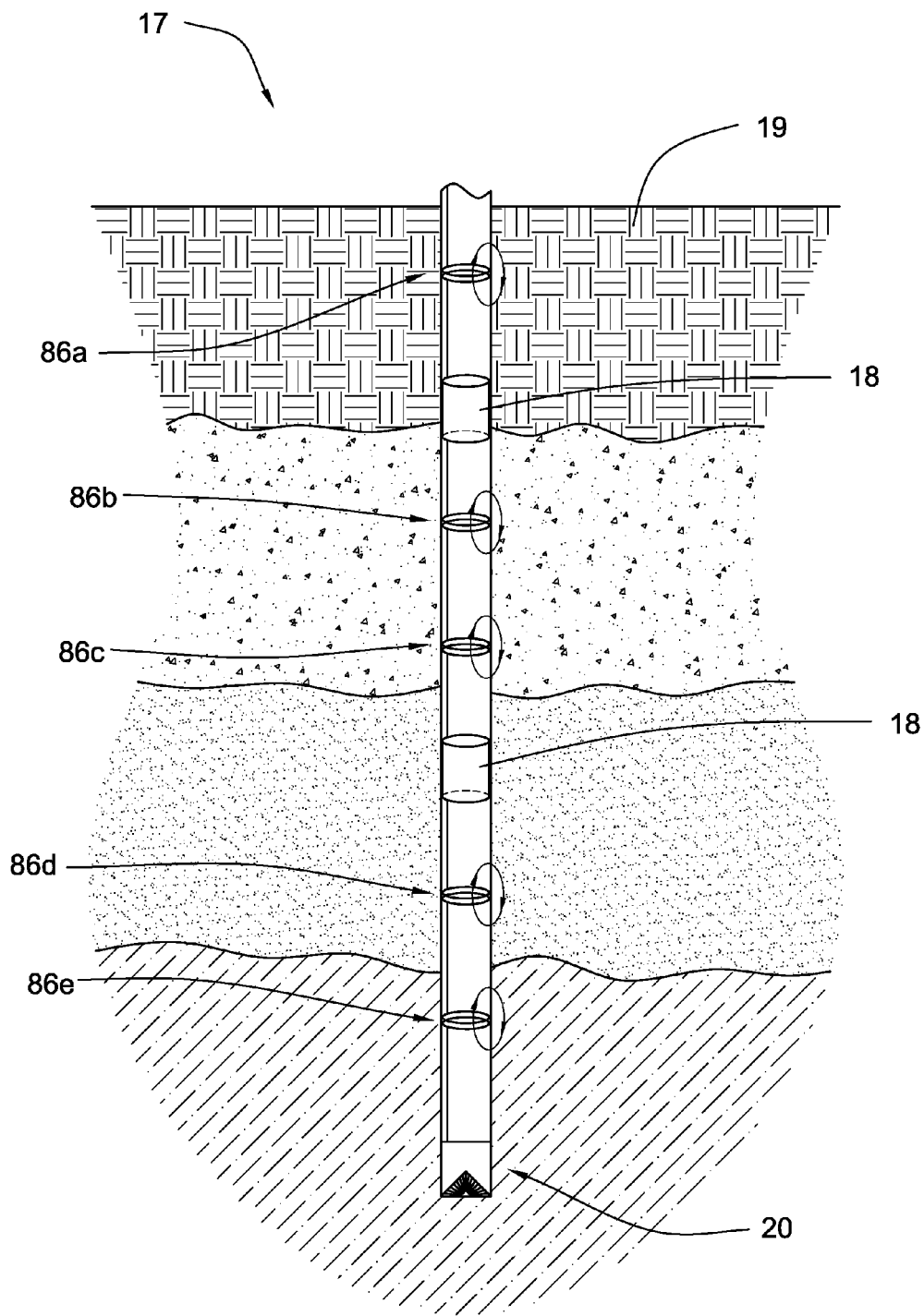
FIG. 4 is a profile view illustrating high-level functionality of one embodiment of a downhole network.

Referring to FIG. 4, in one embodiment, a downhole network 17 in accordance with the invention may include various nodes 18 spaced at selected intervals along the network 17. Each of the nodes 18 may be in operable communication with a bottom-hole assembly 20. As data signals or packets travel up and down the network 17, transmission elements 86*a–e* may be used to transmit signals across tool joints of a drill string 14.

As illustrated, in selected embodiments, inductive coils 86*a–e* may be used to transmit data signals across tool joints. An inductive coil 86 may convert an electrical data signal to a magnetic field. A second inductive coil may detect the magnetic field and convert the magnetic field back to an electrical signal, thereby providing signal coupling across a tool joint. Thus, a direct electrical contact is not needed across a tool joint to provide effective signal coupling. Nevertheless, in other embodiments, direct electrical contacts may be used to transmit electrical signals across tool joints.

In selected embodiments, when using inductive coils 86*a–e*, consistent spacing should be provided between each pair 86*a–e* of inductive coils to provide consistent impedance or matching across each tool joint. This will help to prevent excessive signal loss caused by signal reflections or signal dispersion at the tool joint.

Figure 5:
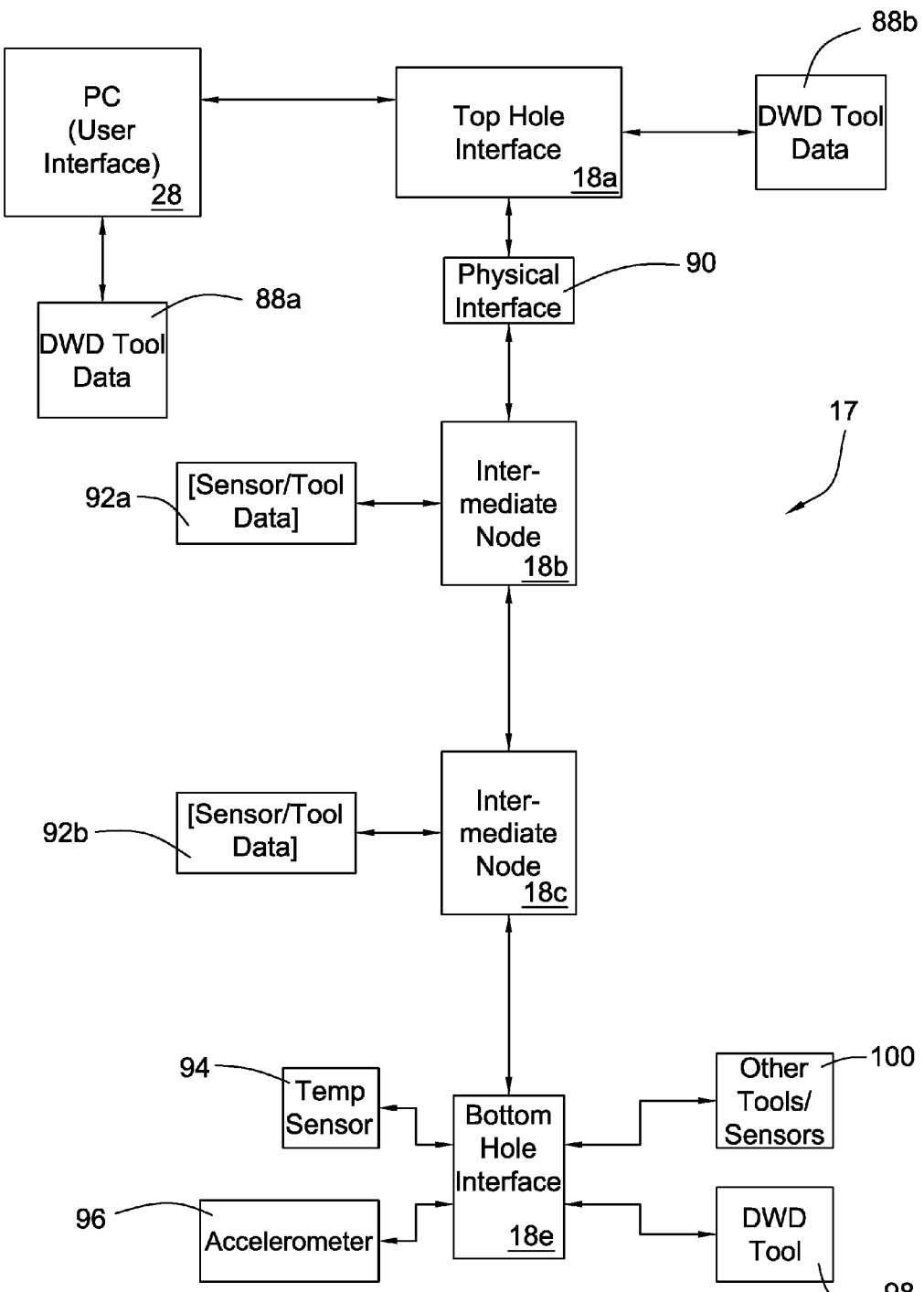
FIG. 5 is a schematic block diagram illustrating one embodiment of nodes used to implement a downhole network in accordance with the invention, and various devices, sensors, and tools interfacing with the nodes.

Referring to FIG. 5, in one embodiment, a downhole network 17 in accordance with the invention may include a top-hole interface 18*a* and a bottom-hole interface 18*e*. A bottom-hole interface 18*e* may interface to various components located in or proximate a bottom-hole assembly 20. For example, a bottom-hole interface 18*e* may interface with a temperature sensor 94, an accelerometer 96, a DWD (diagnostic-while-drilling) tool 98, or other tools 100 or sensors 100, as needed.

The bottom-hole interface 18*e* may communicate with an intermediate node 18*c* located up the drill string. The intermediate node 18*c* may also interface with or receive tool or sensor data 92*b* for transmission up or down the network 17. Likewise, other nodes such as a second intermediate node 18*b* may be located along the drill string and interface with other sensors or tools to gather data 92*a* therefrom. Any number of intermediate nodes 18*b*, 18*c* may be used along the network 17 between the top-hole interface 18*a* and the bottom-hole interface 18*e*.

A physical interface 90 may be provided to connect network components to a drill string 14. For example, since data is transmitted directly up the drill string on cables or other transmission media integrated directly into drill pipe or other drill string components, the physical interface 90 provides a physical connection to the drill string so data may be routed off of the drill string 14 to network components, such as a top-hole interface 18*a*, or personal computer 28.

For example, a top-hole interface 18*a* may be operably connected to the physical interface 90. The top-hole interface 18*a* may be connected to an analysis device 28 such as a personal computer 28. The personal computer 28 may be used to analyze or examine data gathered from various downhole tools or sensors. Likewise, DWD tool data 18*a* may be saved or output from the personal computer 28. Likewise, in other embodiments, DWD tool data 88*b* may be extracted directly from the top-hole interface 18*a* for analysis.

Figure 6:
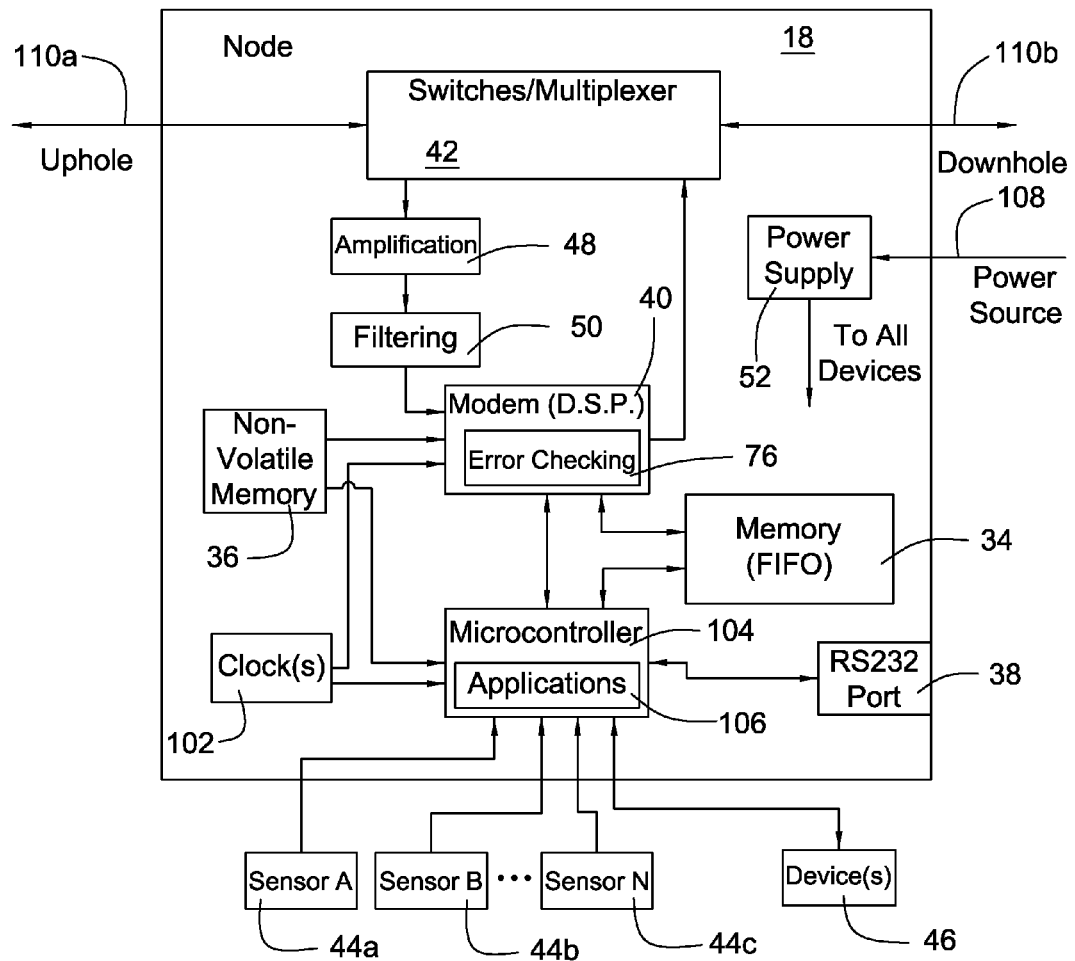
FIG. 6 is a schematic block diagram illustrating additional detail of one embodiment of a node in accordance with the invention.

Referring to FIG. 6, in selected embodiments, a node 18 may include various components to provide desired functionality. For example switches 42, multiplexers 42, or a combination thereof may be used to receive, switch, and multiplex or demultiplex signals, received from other up-hole 110*b* and downhole 110*a* nodes 18. The switches/multiplexers 42 may direct traffic such as data packets or other signals into and out of the node 18, and may ensure that the packets or signals are transmitted at proper time intervals, frequencies, or a combination thereof.

In certain embodiments, the multiplexer 42 may transmit several signals simultaneously on different carrier frequencies. In other embodiments, the multiplexer 42 may coordinate the time-division multiplexing of several signals. Signals or packets received by the switch/multiplexer 42 may be amplified 48 and filtered 50, such as to remove noise. In certain embodiments received signals may simply be amplified 48. In other embodiments, the signals may be received, data may be demodulated therefrom and stored, and the data may be remodulated and retransmitted on a selected carrier frequency having greater signal strength. A modem 40 may be used to demodulate analog signals received from the switch/multiplexer into digital data and modulate digital data onto carriers for transfer to the switches/multiplexer where they may be transmitted uphole or downholeThe modem 40 may also perform various tasks such as error-checking 76. The modem 40 may also communicate with a microcontroller 104. The microcontroller 104 may execute any of numerous applications 106. For example, the microcontroller 104 may run applications 106 whose primary function is acquire data from one or a plurality of sensors 44a–c. For example, the microcontroller 104 may interface to sensors 44 such as inclinometers, thermocouplers, accelerometers, imaging devices, seismic data gathering devices, or other sensors. Thus, the node 18 may include circuitry that functions as a data acquisition tool.

In other embodiments, the microcontroller 104 may run applications 106 that may control various devices 46 located downhole. That is, not only may the node 18 be used as a repeater, and as a data gathering device, but may also be used to receive or provide control signals to control selected devices as needed. The node 18 may include a memory device 34 such as a FIFO 34 that may be used to store data needed by or transferred between the modem 40 and the microcontroller 104.

Other components of the node 18 may include non-volatile memory 36, which may be used to store data, such as configuration settings, node addresses, system settings, and the like. One or several clocks 102 may be provided to provide clock signals to the modem 40, the microcontroller 104, or any other device. A power supply 52 may receive power from an external power source such as batteries. The power supply 52 may provide power to any or all of the components located within the node 18. Likewise, an RS232 port 38 may be used to provide a serial connection to the node circuit 18.

Thus, the node 18 described in FIG. 6 may have many more functions than those supplied by a simple signal repeater. The node 18 may provide many of the advantages of an addressable node on a local area network. The addressable node may amplify signals received from uphole 110b or downhole 110a sources, be used as a point of data acquisition, and be used to provide control signals to desired devices 46. These represent only a few examples of the versatility of the node 18. Thus, the node 18, although useful and functional as a repeater 30, may have a greatly expanded capability.

Figure 7:
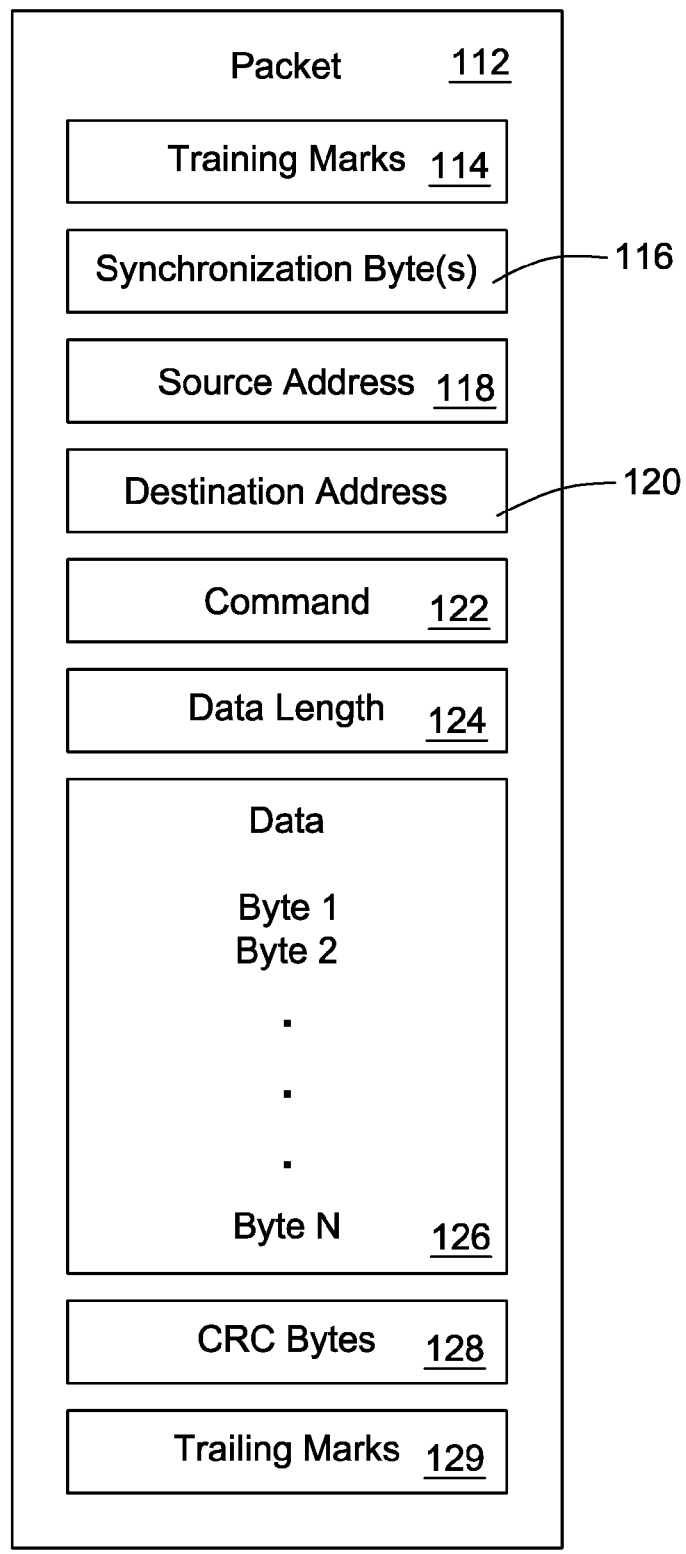
FIG. 7 is a schematic block diagram illustrating one embodiment of a packet used to transmit data between nodes.

Referring to FIG. 7, a packet 112 containing data, control signals, network protocols, and the like may be transmitted up and down the drill string. For example, in one embodiment, a packet 112 in accordance with the invention may include training marks 114. Training marks 114 may include any overhead, synchronization, or other data needed to enable another node 18 to receive a particular data packet 112.

Likewise, a packet 112 may include one or several synchronization bytes 116. The synchronization byte 116 or bytes may be used to synchronize the timing of a node 18 receiving a packet 112. Likewise, a packet 112 may include a source address 118, identifying the logical or physical address of a transmitting device, and a destination address 120, identifying the logical or physical address of a destination node 18 on a network 17.

A method for synchronizing the timing of a node 18 receiving a packet 112 comprises determining a total signal latency between a control device and the node and then sending a synchronizing time from the control device to the node adjusted for the signal latency. Electronic time stamps may be used to measure latency between the control device and the node.

A method for triggering an action of the node synchronized to an event else where on the network comprises determining latency, sending a latency adjusted signal, and performing the action. The latency may be determined between a control device located near the surface and the node. The latency adjusted signal for triggering an action is sent to the node and the action is performed downhole synchronized to the event.

An apparatus for fixing computational latency within a deterministic region in a node may comprise a network interface modem, a high priority module and at least one deterministic peripheral device. The network interface modem is in communication with the network. The high priority module is in communication with the network interface modem. The at least one deterministic peripheral device is connected to the high priority module. The high priority module comprises a packet assembler/disassembler, and hardware for performing at least one operation.

A packet 112 may also include a command byte 122 or bytes 122 to provide various commands to nodes 18 within the network 17. For example, commands 122 may include commands to set selected parameters, reset registers or other devices, read particular registers, transfer data between registers, put devices in particular modes, acquire status of devices, perform various requests, and the like.

Likewise, a packet 112 may include data or information 124 with respect to the length 124 of data transmitted within the packet 112. For example, the data length 124 may be the number of bits or bytes of data carried within the packet 112. The packet 112 may then include data 126 comprising a number of bytes. The data 126 may include data gathered from various sensors or tools located downhole, or may contain control data to control various tools or devices located downhole. Likewise one or several bytes 128 may be used to perform error checking of other data or bytes within a packet 112. Trailing marks 129 may trail other data of a packet 112 and provide any other overhead or synchronization needed after transmitting a packet 112. One of ordinary skill in the art will recognize that network packets 112 may take on many forms and contain varied information. Thus, the example presented herein simply represents one contemplated embodiment in accordance with the invention, and is not intended to limit the scope of the invention.

Figure 8:
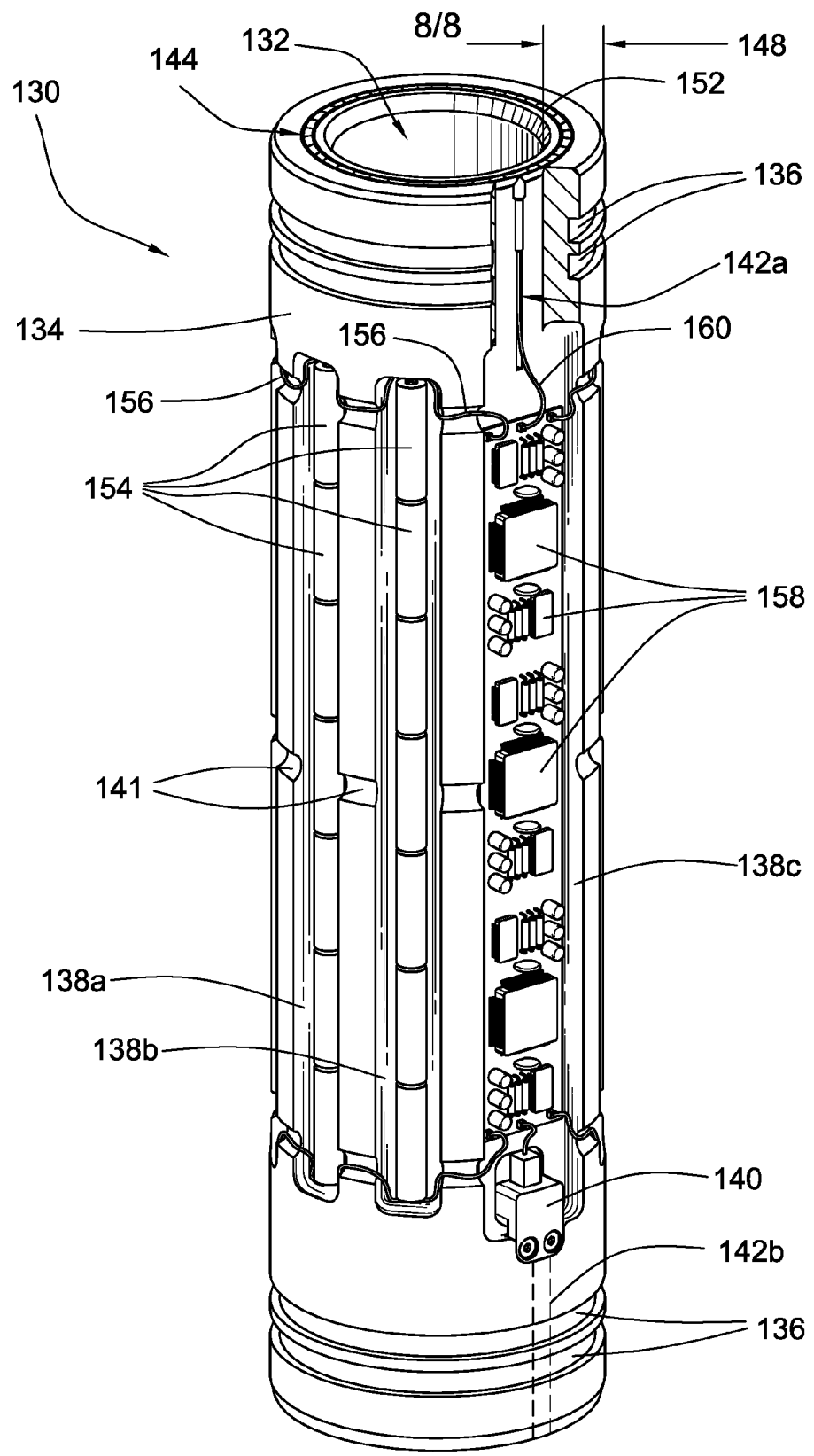
FIG. 8 is perspective view illustrating one embodiment of a downhole module that may be physically installed into a drill string to implement a node in accordance with the invention.

Referring to FIG. 8, a module 130 housing the node 18 may include a cylindrical housing 134 defining a central bore 132. The cylindrical housing 134 may be substantially circular, or in other embodiments, may be polygonal. The central bore 132 may have a diameter that is slightly smaller than the inner bore diameter of a typical section of drill pipe 16 to accommodate and provide space to components of the node 158.

Nevertheless, in selected embodiments, as batteries and electronic components become more compact, it is feasible that the central bore 132 of the module 130 could be substantially equal to that normally encountered in sections of drill pipe 16 or other downhole tools 16. The module 130 may be configured for insertion into a host downhole tool 16. Thus, the module 130 may be removed or inserted as needed to access or service components located therein.

In selected embodiments, the module 130 may include one or several grooves 136 or seal contact surfaces 136 to seal the module 130 within a host downhole tool. Seals inserted into the seal contact surfaces 136 or grooves 136 may prevent fluids such as drilling mud, lubricants, oil, water, and the like from contaminating circuitry or components inside the module 130. Moreover, the entry of other substances such as dirt, rocks, gasses, and the like, may also be prevented.

In selected embodiments, the module 130 may include one or several recesses 138a–c to house various components contained in the module 130. Selected recesses 138 may contain circuitry 158 while others 138 may be used for batteries 154 or other components. One or several channels 141 may be milled or formed into the cylindrical housing 134 to provide for the routing of wires between recesses 138. In selected embodiments, a connector 140 may be used to connect node circuitry 158 to a cable, wire, or other link, traveling up or down the drill string 14.

As illustrated, the module 130 may be characterized by a general wall thickness 148. Likewise, in regions proximate recesses 138 or other channels 141, a thinner wall thickness may be present. Nevertheless, a critical wall thickness should be maintained to provide structural reliability to the module 130 to support stresses encountered in a downhole environment. The cylindrical housing 134 may be constructed of any suitable material including steel, aluminum, plastics, and the like, capable of withstanding the pressures, stresses, temperatures, and abrasive nature of a downhole environment.

As illustrated, one or several transmission paths 142 may be milled or formed into the wall of the module 130 to provide an outlet for cables, wires, or other transmission media exiting the recess 138. In selected embodiments, a connector 140 may be provided to simply link up with or connect to node circuitry 158, or in other embodiments, a channel 142a may enable the routing of cables, wires, and the like from a node circuit 158, within the recess 138c, to a transmission element 152. A transmission element 152 may be provided in an annular recess 144 milled or otherwise formed into the end of the cylindrical housing 134.

As illustrated, a module 130 is equipped with components or circuitry 158 needed to provide functionality to the module 130. For example, batteries 154 connected in series or parallel may be inserted into selected recesses 138 of the module 130. Wires 156 may be routed through channels 141 interconnecting the recesses 138 to connect the batteries 154 together, or to connect the batteries to node circuitry 158.

Likewise, node circuitry 158, or components 158, may be located within other recesses 138. As was previously stated, a conductor 160, cable 160, or other transmission media 160, may travel from the node circuitry 158 to a transmission element 152. The transmission element 152 may transmit energy to another transmission element in contact therewith. The transmission element 152 may have an annular shape and may transmit energy by direct electrical contact, or may convert an electrical current to a magnetic field. The magnetic field may then be detected by another transmission element in close proximity thereto located on a subsequent downhole tool 16.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

The invention claimed is:

1. A downhole network integrated into a drill string comprising a plurality of drill pipes, each of the plurality of pipes having electrically coupled inductive coils at its respective ends, the pipes being connected end-to-end and passing data packets by electromagnetic data communication through the coils;
    a bottom-hole node interfacing to a bottom-hole assembly located proximate a bottom end of the drill string;
    a top-hole node connected proximate a top end of the drill string;
    an intermediate node located along the drill string between the bottom-hole node and the top-hole node, the intermediate node configured to receive and transmit the data packets transmitted between the bottom-hole node and the top-hole node; and
    a communications link, integrated in the drill string, operably connecting the bottom-hole node to the intermediate node, and the intermediate node to the top-hole node wherein timing of at least two of the nodes is synchronized.

2. The downhole network of claim 1, further comprising a personal computer, operably connected to the top-hole node, for analyzing data received from the intermediate and bottom-hole nodes.

3. The downhole network of claim 2, wherein the personal computer comprises a user interface to display data received from the intermediate and bottom-hole nodes.

4. The downhole network of claim 1, wherein the bottom hole assembly includes components selected from the group consisting of a pressure sensor, an inclinometer, a temperature sensor, a thermocoupler, an accelerometer, an imaging device, and a seismic device.

5. The downhole network of claim 1, wherein the intermediate node functions as a repeater.

6. The downhole network of claim 1, wherein the intermediate node performs at least one task selected from the group consisting of signal amplification, filtering, error checking, routing, and switching.

7. The downhole network of claim 1, further comprising a module, housing the intermediate node, insertable at a point along the drill string.

8. The downhole network of claim 1, wherein the intermediate node is further configured to gather data from at least one of a downhole sensor and a downhole tool, located along the drill string, proximate the intermediate node.

9. The downhole network of claim 1, wherein at least one of the top-hole node, the intermediate node, and the bottom-hole node is assigned a unique network address.

10. The downhole network of claim 1, wherein the packets include a source address, identifying the source of a packet, and a destination address, identifying the destination of a packet.

11. The downhole network of claim 1, wherein the packets carry data originating from at least one of the group consisting of pressure sensors, inclinometers, temperature sensors, thermocouplers, accelerometers, imaging devices, and seismic devices.

12. A method for transmitting information along a drill string, comprising a plurality of drill pipes, each of the plurality of pipes having electrically coupled inductive coils at its respective ends, the pipes being connected end-to-end and passing data packets by electromagnetic data communication through the coils; the method comprising:
    transmitting, from a bottom-hole node, a first data packet along a communications link integrated into the drill sting;
    receiving, by an intermediate node located at an intermediate location along the drill string, and operably connected to the communications link, the first data packet;

amplifying, by the intermediate node, the first data packet; and forwarding, by the intermediate node, the first data packet to a top-hole node operably connected to the communications link.

13. The method of claim 12, further comprising receiving, by a personal computer, the first data packet from the top-hole node, for analysis.

14. The method of claim 13, wherein the receiving, by a personal computer, further comprises displaying, on a user interface, data received from the intermediate and bottom-hole nodes.

15. The method of claim 12, further comprising processing, by the intermediate node, the first data packet, wherein processing includes at least one task selected from the group consisting of filtering, error checking, routing, and switching.

16. The method of claim 12, further comprising housing the intermediate node in a module insertable at a point along the drill string.

17. The method of claim 12, wherein at least one of the top-hole node, the intermediate node, and the bottom-hole node is assigned a unique network address.

18. The method of claim 12, further comprising gathering, by the intermediate node, a second data packet containing data gathered from at least one of a downhole sensor and a downhole tool, located along the drill string, proximate the intermediate node.

19. The method of claim 18, wherein the first and second packets include a source address, identifying the source of the packet, and a destination address, identifying the destination of the packet.

20. The method of claim 18, wherein the first and second data packets carry data originating from at least one of the group consisting of pressure sensors, inclinometers, temperature sensors, thermocouplers, accelerometers, imaging devices, and seismic devices.

* * * * *